(12) United States Patent
Karlsson

(10) Patent No.: US 11,505,015 B2
(45) Date of Patent: Nov. 22, 2022

(54) DETERMINING A TIRE PRESSURE STATUS IN A VEHICLE

(71) Applicant: Nira Dynamics AB, Linköping (SE)

(72) Inventor: Rickard Karlsson, Linköping (SE)

(73) Assignee: Nira Dynamics AB, Linköping (SE)

( * ) Notice: Subject to any disclaimer, the term of this patent is extended or adjusted under 35 U.S.C. 154(b) by 348 days.

(21) Appl. No.: 16/955,103

(22) PCT Filed: Dec. 20, 2018

(86) PCT No.: PCT/EP2018/086349
§ 371 (c)(1),
(2) Date: Jun. 18, 2020

(87) PCT Pub. No.: WO2019/122218
PCT Pub. Date: Jun. 27, 2019

(65) Prior Publication Data
US 2020/0307327 A1  Oct. 1, 2020

(30) Foreign Application Priority Data
Dec. 20, 2017 (SE) ..................... 1751592-5

(51) Int. Cl.
*B60C 23/06* (2006.01)
*G06N 20/00* (2019.01)
*G06N 5/04* (2006.01)

(52) U.S. Cl.
CPC ............ *B60C 23/061* (2013.01); *G06N 5/04* (2013.01); *G06N 20/00* (2019.01)

(58) Field of Classification Search
None
See application file for complete search history.

(56) References Cited

U.S. PATENT DOCUMENTS 5,734,319 A   3/1998  Stephens et al.
6,339,956 B1  1/2002  Huinink et al.
(Continued)

FOREIGN PATENT DOCUMENTS

CN   103863029 A   6/2014
CN   112440628 A   3/2021
(Continued)

OTHER PUBLICATIONS

Sipeng et al., Automobile body electronic control system maintenance.

*Primary Examiner* — Thomas S McCormack
(74) *Attorney, Agent, or Firm* — Faegre Drinker Biddle & Reath LLP

(57) ABSTRACT

A system for determining a tire pressure status in a vehicle is provided. The system includes at least one processing device, which may be arranged to: estimate values of a set of predetermined vehicle parameters; calculate a tire pressure parameter as a predetermined function of the values of the set of predetermined vehicle parameters, wherein said predetermined function has been generated by training a machine learning system, such as, for example, a neural network or a Support Vector Machine, using values of a large number of sets of predetermined vehicle parameters and associated tire pressure parameters; and determine a tire pressure status, indicating whether or not there is tire underinflation, by comparing said tire pressure parameter with a threshold.

22 Claims, 4 Drawing Sheets

(56) References Cited

U.S. PATENT DOCUMENTS

| | | |
|---|---|---|
| 7,263,458 B2 | 8/2007 | Hall et al. |
| 8,630,767 B2 | 1/2014 | Karlsson et al. |
| 8,825,267 B2 | 9/2014 | Gerdin et al. |
| 2001/0015548 A1 | 8/2001 | Breed et al. |
| 2001/0025679 A1 | 10/2001 | Dufournier et al. |
| 2014/0163816 A1 | 6/2014 | Singh et al. |
| 2014/0172251 A1* | 6/2014 | Championnet ........... G01P 3/44 701/51 |
| 2015/0019165 A1* | 1/2015 | Theuss ................... G01G 19/12 702/173 |
| 2015/0096362 A1* | 4/2015 | Hammerschmidt .. G01M 17/02 73/146 |
| 2018/0162182 A1* | 6/2018 | Coombs ................. F16K 17/26 |
| 2019/0025160 A1* | 1/2019 | Marble ................. G01M 17/04 |
| 2021/0061022 A1 | 3/2021 | Singh et al. |

FOREIGN PATENT DOCUMENTS

| | | |
|---|---|---|
| EP | 0 729 855 A1 | 9/1996 |
| EP | 0832766 A2 | 4/1998 |
| EP | 0844112 A1 | 5/1998 |
| EP | 1 026 490 A2 | 8/2000 |
| EP | 1184209 A2 | 3/2002 |
| EP | 1272365 A1 | 1/2003 |
| EP | 1094958 B1 | 9/2005 |
| EP | 1701871 A1 | 9/2006 |
| EP | 1272365 B1 | 3/2010 |
| EP | 2982521 A1 | 2/2016 |
| FR | 3013001 A1 | 5/2015 |
| JP | 2000-203217 A | 7/2000 |
| WO | WO-2005/005173 A1 | 1/2005 |
| WO | WO-2008/113379 A1 | 9/2008 |
| WO | WO-2011/054363 A1 | 5/2011 |
| WO | WO-2015/188929 A1 | 12/2015 |

* cited by examiner

DETERMINING A TIRE PRESSURE STATUS IN A VEHICLE

CROSS-REFERENCE TO PRIOR APPLICATIONS

This application is a § 371 National Stage Application of PCT International Application No. PCT/EP2018/086349 filed Dec. 20, 2018, which claims priority to Swedish Application No. 1751592-5 filed on Dec. 20, 2017, both of which are incorporated herein in their entirety.

Technical Field

The present disclosure relates generally to systems and methods for determining a tire pressure status in a vehicle.

Background

Tire pressure monitoring is an important safety aspect in vehicle design, since under-inflated tires may cause accidents. Tire pressure monitoring also has a driving economy aspect, since both the fuel consumption and the tire wear may be lower if the tires of a vehicle have an optimal air pressure.

In a conventional indirect tire pressure monitoring system, a calibration or learning phase is needed after a tire change or tire pressure inflation. This calibration or learning phase is often triggered by the user of the vehicle, e.g. by requesting calibration when a tire change or tire pressure inflation has taken place. If the user forgets to initiate calibration of the tire pressure monitoring system after a tire change or tire pressure inflation, the system may not behave optimally.

Problems with the Prior Art

In general, a tire pressure monitoring system requiring calibration or learning needs some initial time before the functionality is optimal, since the calibration or learning sequence may last for as long as 10-15 minutes. Further, if calibration takes place although there is tire under-inflation without on-going pressure leakage, the tire pressure monitoring system may not be able to detect this. An optimal functionality of such a tire pressure monitoring system thus relies on the user only requesting calibration when the tires have a correct pressure.

There is thus a need for an improved system and method for determining a tire pressure status in a vehicle.

SUMMARY

The above described problem is addressed by the claimed system for determining a tire pressure status in a vehicle. The system may comprise at least one processing device arranged to: estimate values of a set of predetermined vehicle parameters; calculate a tire pressure parameter based on the values of the set of predetermined vehicle parameters; and determine a tire pressure status, indicating whether or not there is tire under-inflation, by comparing said tire pressure parameter with a threshold. The tire pressure parameter is calculated using a pre-trained machine learning system or predetermined function, which has been generated by training a machine learning system using values of a large number of sets of predetermined vehicle parameters and associated tire pressure parameters. This enables the generation of a complex function in a relatively simple way. By this system, a tire pressure status may be determined without the system first needing calibration. Further, this system may be used together with a conventional indirect tire pressure monitoring system requiring calibration in order to ignore calibration requests that are made although there is tire under-inflation. This will enhance the functionality of the system and mitigate misuse.

The above described problem is further addressed by the claimed method for determining a tire pressure status in a vehicle. The method may comprise: generating a machine learning system or function by training a machine learning system, using values of a large number of sets of predetermined vehicle parameters and associated tire pressure parameters; estimating values of a set of predetermined vehicle parameters; calculating a tire pressure parameter using said predetermined function, based on the values of the set of predetermined vehicle parameters; and determining a tire pressure status, indicating whether or not there is tire under-inflation, by comparing said tire pressure parameter with a threshold. This enables the generation of a complex function in a relatively simple way. By this method, a tire pressure status may be determined without the system first needing calibration. Further, this method may be used in a conventional indirect tire pressure monitoring system requiring calibration in order to ignore calibration requests that are made although there is tire under-inflation. This will enhance the functionality of the system and mitigate misuse.

The pre-trained machine learning system or predetermined function may have been generated to be specific to a particular vehicle model, or be more generic, so that it may be used in many different types of vehicles.

In embodiments, the pre-trained machine learning system or predetermined function has been generated using values of the sets of predetermined vehicle parameters where brief fluctuations have been removed, such as by averaging and/or calculating the standard deviation and/or the variance.

In embodiments, the tire pressure parameter indicates the tire pressure level, e.g. as a percentage of the nominal tire pressure, and the tire pressure status is set to be TRUE if the tire pressure parameter is smaller than the threshold, and FALSE if the tire pressure parameter is not smaller than the threshold.

In embodiments, the tire pressure parameter indicates by how much the tire pressure has fallen, e.g. as a fall in percentage of the nominal tire pressure, and the tire pressure status is set to be TRUE if the tire pressure parameter is greater than the threshold, and FALSE if the tire pressure parameter is not greater than the threshold.

It is of course possible to use other status denominators than TRUE and FALSE, as long as the determined tire pressure status indicates whether or not there is tire under-inflation.

In embodiments, a calibration request signal, indicating whether calibration of a tire pressure monitoring system has been requested, may be received. In embodiments, the estimating, calculating and determining takes place when such a calibration request signal has been received. In embodiments, such a calibration request signal is ignored and any active tire pressure warnings are maintained or reissued if the tire pressure status indicates that there is tire under-inflation, such as by the tire pressure status being set to TRUE. This makes it possible to ignore calibration requests that are made when there is tire under-inflation.

In embodiments, the set of predetermined vehicle parameters comprises parameters representing spectral characteristics of the wheel speed signal.

In embodiments, the set of predetermined vehicle parameters comprises at least the resonance frequency and the longitudinal stiffness or slip slope.

In embodiments, the at least one processing device is an Electronic Control Unit (ECU) of the vehicle.

In embodiments, the at least one processing device is a number of different processing devices, between which signals are transmitted.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
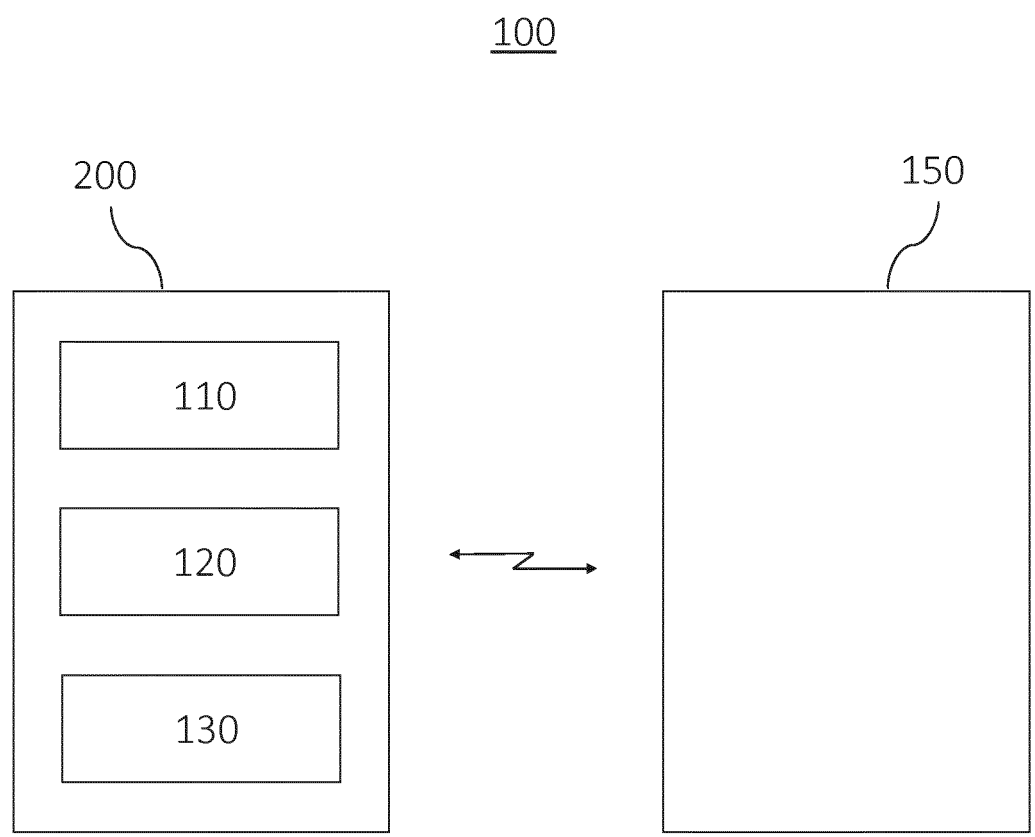
FIG. 1 schematically illustrates a system for determining a tire pressure status in a vehicle, in accordance with one or more embodiments described herein.

Tire pressure monitoring is an important safety aspect in vehicle design, since under-inflated tires may cause accidents. Tire pressure monitoring also has a driving economy aspect, since both the fuel consumption and the tire wear may be lower if the tires of a vehicle have an optimal air pressure. In order for a conventional tire pressure monitoring system to behave optimally, a calibration or learning phase is usually needed after a tire change or tire pressure inflation.

There are many different ways of performing conventional tire pressure monitoring. Indirect tire pressure monitoring may e.g. involve a wheel radius analysis and a wheel vibration analysis, e.g. as described in U.S. Pat. No. 7,263,458, and/or longitudinal and/or lateral vehicle dynamics, e.g. as described in EP1272365.

In the wheel radius analysis described in U.S. Pat. No. 7,263,458, wheel radii are estimated by comparing the wheel speeds of each vehicle wheel (which may e.g. be measured by wheel speed sensors) with the vehicle's actual driving velocity. Constant driving velocity provided, the wheel speed increases when the wheel radius decreases due to tire pressure loss.

In the wheel vibration analysis described in U.S. Pat. No. 7,263,458, wheel vibration phenomena (which may be measured by wheel speed sensors) are detected within the time dependent behavior of the rotational velocity of an individual vehicle wheel. The spectral properties (e.g. the energy distribution in different frequency bands) of a wheel angular velocity signal depends on the tire pressure of the individual vehicle wheel. If the spectral properties of a wheel changes over time, this may thus be an indication of tire under-inflation.

The combination of a wheel radius analysis and a wheel vibration analysis increases the certainty of the determination of which wheel that has an under-inflation problem. Fusion of the wheel radius analysis and the wheel vibration analysis thus increases the certainty of tire pressure monitoring.

U.S. Pat. No. 7,263,458 and EP1272365 describe tire pressure estimation involving the estimation of parameters such as the longitudinal stiffness or slip slope k, the relative difference in wheel radii or slip offset 6, and the resonance frequency tyres. The longitudinal stiffness or slip slope k depends on both the tire pressure and the road condition.

A number of different factors may be taken into account in tire pressure monitoring. In addition to the parameters used in U.S. Pat. No. 7,263,458 and EP1272365, vehicle specific parameters, information about absolute velocity, load changes, friction, etc. may be used to improve the tire pressure monitoring. Vehicle specific parameters may e.g. be information regarding whether the vehicle is front wheel driven, rear wheel driven or all wheel driven. This information may be provided to the system.

Information about the type of tire, and/or whether snow chains have been mounted on any of the wheels, may also be used to improve tire pressure monitoring. Since different types of tires have different properties, they may react differently when the tire pressure changes. A wheel vibration analysis may thus give different results depending on the properties of the tire. A tire classification method is described in WO2015/188929. Further, a wheel vibration analysis will of course be affected by whether snow chains are mounted on the wheel.

Information about load changes in the vehicle may e.g. be used to compensate for wheel radius and/or wheel vibration differences that are unrelated to any problems with the wheels. If the vehicle is loaded unevenly, or moves uphill or downhill, a wheel radius analysis and a wheel vibration analysis will detect anomalies even though there is no tire under-inflation problem. In order to avoid false alarms or nuisance warnings, it is therefore advantageous to compensate for load changes.

Load changes may be determined e.g. using information about axle height, longitudinal acceleration, vertical acceleration, torque, engine RPM, altitude, yaw rate, pitch, roll, and/or signals from the suspension system, such as suspension compression factors in an air suspension system. U.S. Pat. No. 8,630,767 describes how the load of a vehicle can be estimated based on vehicle data indicative of a current driving situation, and U.S. Pat. No. 8,825,267 describes the use of suspension information in tire pressure deviation detection for a vehicle tire. Various flags set in the at least one vehicle processor based on whether the vehicle is braking, shifting gears, reversing or has a trailer attached may assist in the determination of load changes. GPS information together with map data comprising terrain information may also assist in the determination of load changes.

Further, information about the friction between the tire and the road surface may be used to compensate for wheel radius and/or wheel vibration differences that are unrelated to any tire under-inflation problems. If the wheels slip, this may affect the determination of the wheel radius and/or the wheel vibration. Any information that can be used to determine slip of the wheels that is unrelated to any tire under-inflation problems may therefore be used to improve tire pressure monitoring. EP1701871 and WO2011/054363 describe various types of road condition monitoring. If it can e.g. be determined that the road condition is different for different wheels, e.g. because the vehicle is driving close to the edge of a road so that the right wheels are driving in gravel although the left wheels are driving on asphalt, this information may be used to improve tire pressure monitoring. Information from a temperature sensor may also assist in determining friction, especially at low temperatures.

The present disclosure relates generally to systems and methods for determining a tire pressure status in a vehicle. Embodiments of the disclosed solution are presented in more detail in connection with the figures.

FIG. 1 schematically illustrates a system 100 for determining a tire pressure status $S_p$ in a vehicle, in accordance with one or more embodiments described herein. The system 100 comprises at least one processing device 110, which may be arranged to: estimate values $V_1, \ldots, V_n$ of a set of predetermined vehicle parameters $P_1, \ldots, P_m$; calculate a tire pressure parameter $T_p$ based on the values $V_1, \ldots, V_n$ of the set of predetermined vehicle parameters $P_1, \ldots, P_m$; and determine a tire pressure status $S_p$, indicating whether or not there is tire under-inflation, by comparing said tire pressure parameter $T_p$ with a threshold $T_t$. The tire pressure parameter $T_p$ is preferably calculated using a pre-trained machine learning system or predetermined function F, which has been generated by training a machine learning system using values $V_1, \ldots, V_n$ of a large number of sets of predetermined vehicle parameters $P_1, \ldots, P_m$ and associated tire pressure parameters $T_p$. The system 100 may also comprise a user interface 120, through which a calibration request signal may be received.

The set of predetermined vehicle parameters $P_1, \ldots, P_m$ may e.g. comprise a number of the vehicle parameters that are calculated by an indirect tire pressure monitoring system during a determination of tire pressure, such as e.g. parameters representing spectral characteristics of the wheel speed signal. One such vehicle parameter may e.g. be a frequency property of the tire, such as one or more resonance frequencies $\omega_{res}$. EP1272365 describes one way of determining a resonance frequency $\omega_{res}$ for a tire. The frequency properties may e.g. be analyzed in order to determine the energy content of the frequency curve.

Such vehicle parameters may additionally be e.g. the longitudinal stiffness or slip slope k, and/or the relative difference in wheel radii δ, as described in EP1272365, and/or the energy distribution in different frequency bands in the time dependent behavior of the rotational velocity, and/or or more resonance frequencies and/or damping factors, as described in U.S. Pat. No. 7,263,458. The longitudinal stiffness or slip slope k may be determined using the equation s=1/k*μ+δ delta, where s is the slip, 1/k is the slip slope, μ is the normalized traction force, and δ is the relative wheel radii. The longitudinal stiffness or slip slope k depends on both the tire pressure and the road condition.

The tire pressure parameter $T_p$ is preferably calculated based on the values $V_1, \ldots, V_n$ of the set of predetermined vehicle parameters $P_1, \ldots, P_m$, using a pre-trained machine learning system or predetermined function F. The tire pressure parameter may e.g. be an estimate of the tire pressure or the tire pressure loss, or an estimate of the percentage of the nominal tire pressure or the tire pressure loss is relation to the nominal tire pressure. The tire pressure status $S_p$ is then determined by comparing the tire pressure parameter $T_p$ with a threshold $T_t$, which is preferably set based on the acceptable tire pressure loss. The threshold $T_t$ may e.g. be set so that only large tire pressure changes are detected.

The pre-trained machine learning system or predetermined function F is preferably generated by training a machine learning system using values $V_1, \ldots, V_n$ of a large number of sets of predetermined vehicle parameters $P_1, \ldots, P_m$ and associated tire pressure parameters $T_p$. If the pre-trained machine learning system or predetermined function F is generated based on enough values $V_1, \ldots, V_n$ of sets of predetermined vehicle parameters $P_1, \ldots, P_m$ from many different types of vehicles, this generates a generic pre-trained machine learning system or predetermined function F that may be used in many different types of vehicles. Alternatively, the pre-trained machine learning system or predetermined function F may be generated based on values $V_1, \ldots, V_n$ of sets of predetermined vehicle parameters $P_1, \ldots, P_m$ from just one single vehicle model, which may make the pre-trained machine learning system or predetermined function F more specific to this particular vehicle type or model, and possibly also more accurate for this particular vehicle type or model. The machine learning system may e.g. be a neural network or a Support Vector Machine.

The tire pressure parameter $T_p$ may e.g. indicate by how much the tire pressure has fallen, as a fall in percentage of the nominal tire pressure. The training of the machine learning system preferably involves a systematic collection of data, by driving vehicles in many different conditions and collecting values $V_1, \ldots, V_n$ of the sets of predetermined vehicle parameters $P_1, \ldots, P_m$ at different known tire pressure levels. If enough values $V_1, \ldots, V_n$ of the sets of predetermined vehicle parameters $P_1, \ldots, P_m$ are collected for both the nominal tire pressure and known levels of tire under-inflation, such as e.g. 5%, 10%, 15%, 20%, 25%, 30% and 35% under-inflation, the machine learning system may learn to determine the tire pressure parameter $T_p$ as an estimated level of tire under-inflation, e.g. as a fall in percentage of the nominal tire pressure.

If the system 100 comprises an external processing device 150, which may e.g. be cloud based, the pre-trained machine learning system or predetermined function F may e.g. be continuously improved using values $V_1, \ldots, V_n$ of a large number of sets of predetermined vehicle parameters $P_1, \ldots, P_m$ and associated tire pressure parameters $T_p$ from a large number of vehicles. The determination of the tire pressure parameter $T_p$ may also be distributed between a vehicle processing device 110 and an external processing device 150, e.g. as described in the co-pending SE1750775-7. For example, a basic internal function F, may be stored in a ROM or RAM memory of the vehicle processing device 110, and an enhanced external function $F_e$ may be located in the cloud and continuously improved using values $V_1, \ldots, V_n$ of sets of predetermined vehicle parameters $P_1, \ldots, P_m$ and associated tire pressure parameters $T_p$ of vehicles connected to the external processing device 150. The basic internal function F, may e.g. be a generic function F, and enhanced external function $F_e$ may e.g. be a function that is more specific to a particular vehicle type or vehicle model.

The values $V_1, \ldots, V_n$ of the set of predetermined vehicle parameters $P_1, \ldots, P_m$ may be instantaneous values $V_1, \ldots, V_n$ but they are preferably values $V_1, \ldots, V_n$ where brief fluctuations are removed, such as by averaging and/or calculating the standard deviation and/or the variance. This simplifies the generation of the pre-trained machine learning system or predetermined function F.

Figure 2:
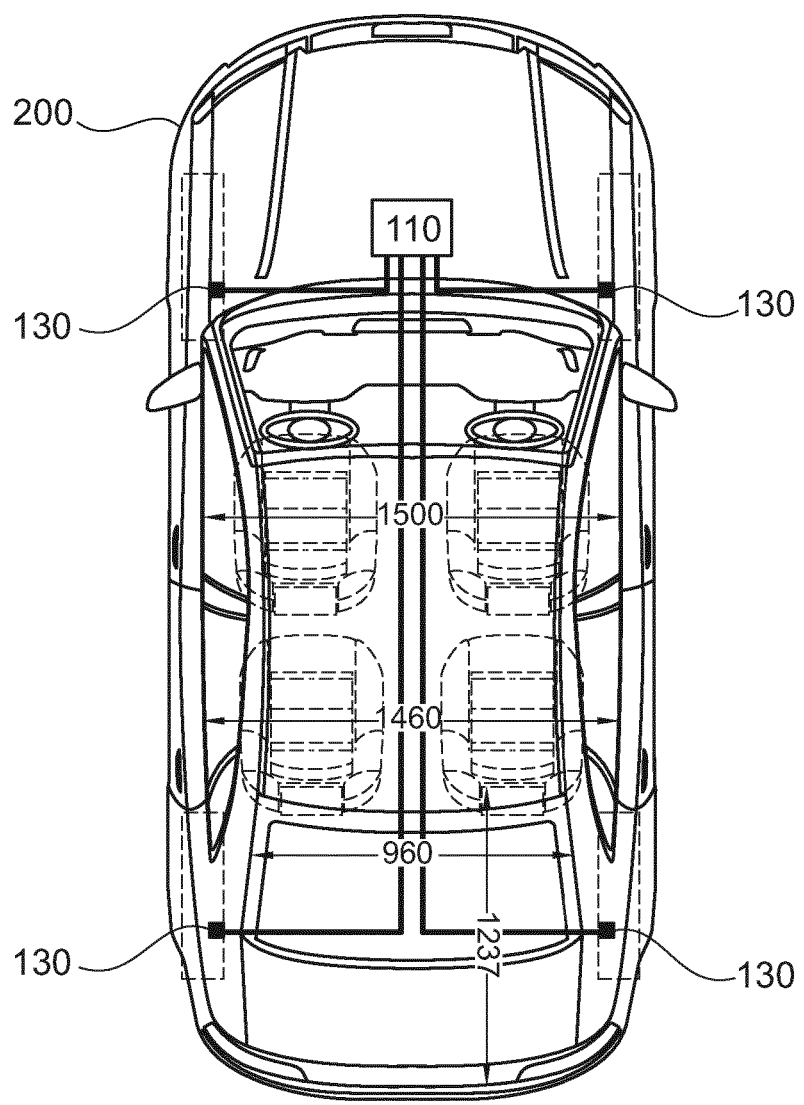
FIG. 2 schematically illustrates a vehicle, in accordance with one or more embodiments described herein.

FIG. 2 schematically illustrates a vehicle 200, in accordance with one or more embodiments described herein. The vehicle 200 comprises at least one processing device 110, which may e.g. be an ECU of the vehicle 200. The at least one processing device 110 may be arranged anywhere in the vehicle 200. The vehicle 200 shown in FIG. 2 further comprises four rotational speed sensors 130, one for each wheel. The signals from the sensors 130 are transmitted to the at least one processing device 110, where they may be used as a basis for determining a tire pressure status $S_p$ in the vehicle 200.

The sensors 130 may also be other types of sensors. For determining load changes in the vehicle, information about e.g. the torque and the engine RPM may be needed, and this can e.g. be determined based on measurements from various engine sensors. A pressure sensor such as e.g. a barometer may be used to determine the altitude, and based on this determine whether the vehicle is driving uphill or downhill. Various types of accelerometers and/or gyroscopes, e.g. in the form of an inertial measurement unit (IMU), may be used to determine e.g. yaw rate, pitch, roll, longitudinal acceleration, lateral acceleration and vertical acceleration, to be used for determining load changes and/or other vehicle dynamics properties in the vehicle. Axle height information may e.g. be provided by sensors which are arranged in the vehicle for adapting the direction of the vehicle lights. The absolute velocity may e.g. be determined using a GPS sensor, or using another velocity recognizing sensor such as a camera, a radar, an IR sensor, or a laser sensor. Information from a temperature sensor may assist in determining both the friction and the tire pressure parameter $T_p$.

Figure 3:
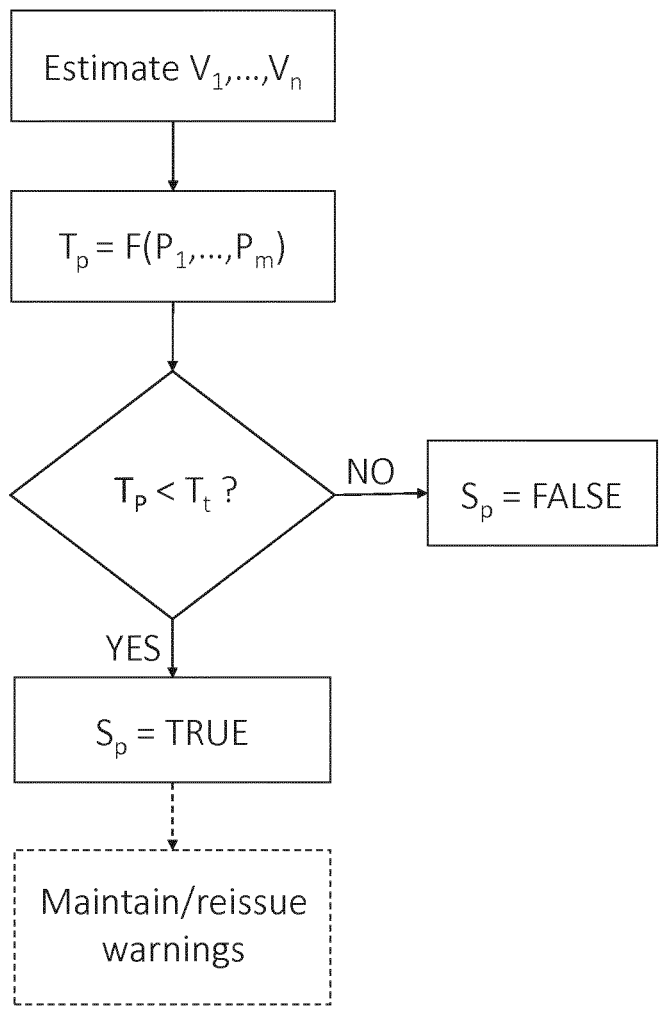
FIG. 3 schematically illustrates a flow diagram for an example method for determining a tire pressure status in a vehicle, in accordance with one or more embodiments described herein.

FIG. 3 schematically illustrates a flow diagram for an example method of determining a tire pressure status $S_p$ in a vehicle, in accordance with one or more embodiments described herein. According to the flow diagram, values $V_1, \ldots, V_n$ of a set of predetermined vehicle parameters $P_1, \ldots, P_m$ are estimated, and a tire pressure parameter $T_p$ is calculated as a pre-trained machine learning system or predetermined function F of the values $V_1, \ldots, V_n$ of the set of predetermined vehicle parameters $P_1, \ldots, P_m$. A tire pressure status $S_p$, indicating whether or not there is tire under-inflation, is then determined by comparing the tire pressure parameter $T_p$ with a threshold $T_t$.

The tire pressure parameter may e.g. be an estimate of the tire pressure or the tire pressure loss, or an estimate of the percentage of the nominal tire pressure, or the tire pressure loss in relation to the nominal tire pressure. The threshold $T_t$ is preferably set based on the acceptable tire pressure loss. The threshold $T_t$ may e.g. be set so that only large tire pressure changes are detected.

One way of determining the tire pressure status $S_p$ is to evaluate whether the tire pressure parameter $T_p$ is smaller than a threshold $T_t$. If the tire pressure parameter $T_p$ is smaller than the threshold $T_t$, this indicates that the tire pressure is below a specified minimum tire pressure, either as an absolute tire pressure or as a percentage of the nominal tire pressure, and this is an indication that there is tire under-inflation. The tire pressure status $S_p$ may then be determined to be TRUE. If the tire pressure parameter $T_p$ is not smaller than the threshold $T_t$, the tire pressure status $S_p$ may be determined to be FALSE.

It is of course possible to use other status denominators than TRUE and FALSE, and/or to instead determine whether the tire pressure parameter $T_p$ is greater than a threshold (if the tire pressure parameter e.g. indicates by how much the tire pressure has fallen, either as an absolute tire pressure fall or as a fall in percentage of the nominal tire pressure), as long as the determined tire pressure status $S_p$ indicates whether or not there is tire under-inflation.

If the tire pressure status $S_p$ indicates that there is tire under-inflation, such as by the tire pressure status $S_p$ being set to TRUE, any active tire pressure warnings may be maintained or reissued and any calibration request signals may be ignored.

The threshold $T_t$ may be determined in different ways, and it may also be adaptable. In situations where it is desirable not to miss the detection of tire under-inflation, the threshold $T_t$ may be set high, at the cost of sometimes incorrectly detecting tire under-inflation. Alternatively, in situations where it is desirable never to erroneously detect tire under-inflation, the threshold $T_t$ may be set low. The threshold $T_t$ may e.g. be set based on various types of vehicle monitoring data.

Figure 4:
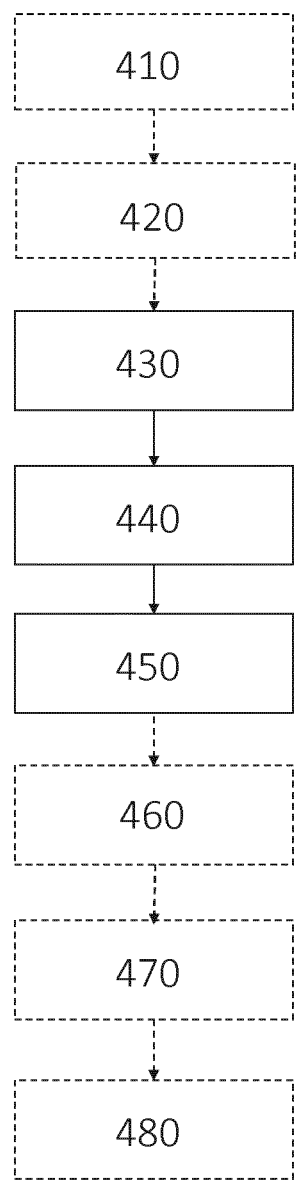
FIG. 4 schematically illustrates a method for determining a tire pressure status in a vehicle, in accordance with one or more embodiments described herein.

FIG. 4 schematically illustrates a method 400 for determining a tire pressure status $S_p$ in a vehicle, in accordance with one or more embodiments described herein. The method 400 may comprise:

Step 410: generating a machine learning system or function F by training a machine learning system, such as e.g. a neural network, using values $V_1, \ldots, V_n$ of a large number of sets of predetermined vehicle parameters $P_1, \ldots, P_m$ and associated tire pressure parameters $T_p$.

Step 430: estimating values $V_1, \ldots, V_n$ of a set of predetermined vehicle parameters $P_1, \ldots, P_m$.

Step 440: calculating a tire pressure parameter $T_p$, using said predetermined function F, based on the values $V_1, \ldots, V_n$ of the set of predetermined vehicle parameters $P_1, \ldots, P_m$.

Step 450: determining a tire pressure status $S_p$, indicating whether or not there is tire under-inflation, by comparing said tire pressure parameter $T_p$ with a threshold $T_t$.

This enables the generation of a complex pre-trained machine learning system or predetermined function in a relatively simple way. By this method, a tire pressure status may be determined without the system first needing calibration. Further, this method may be used in a conventional indirect tire pressure monitoring system requiring calibration in order to ignore calibration requests that are made although there is tire under-inflation. This will enhance the functionality of the system and mitigate misuse.

In embodiments, the set of predetermined vehicle parameters $P_1, \ldots, P_m$ comprises at least the resonance frequency tyres and the longitudinal stiffness or slip slope k.

The pre-trained machine learning system or predetermined function F may be generated to be specific to a particular vehicle type or model, or be more generic, so that it may be used in many different types or models of vehicles.

The method 400 may further comprise one or more of the following:

Step 420: receiving a calibration request signal, indicating whether calibration of a tire pressure monitoring system has been requested.

In embodiments, the estimating 430, calculating 440 and determining 450 take place when a calibration request signal has been received.

Step 460: setting the tire pressure status $S_p$ to be TRUE if the tire pressure parameter $T_p$ is smaller than the threshold $T_t$, and FALSE if the tire pressure parameter $T_p$ is not smaller than the threshold $T_t$.

Step 470: ignoring the calibration request signal if the tire pressure status $S_p$ indicates that there is tire under-inflation, such as by the tire pressure status $S_p$ being set to TRUE.

Step 480: maintaining or reissuing any active tire pressure warnings if the tire pressure status $S_p$ indicates that there is tire under-inflation, such as by the tire pressure status $S_p$ being set to TRUE.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A system for determining a tire pressure status in a vehicle, the system comprising at least one processing device arranged to:
   estimate values of a set of predetermined vehicle parameters;
   calculate a tire pressure parameter based on the values of the set of predetermined vehicle parameters using a pre-trained machine learning system or predetermined function; and
   determine a tire pressure status, indicating whether or not there is tire under-inflation, by comparing said tire pressure parameter with a threshold,
   wherein the set of predetermined vehicle parameters comprises parameters representing spectral characteristics of a wheel speed signal.

2. The system according to claim 1,
   wherein the at least one processing device is arranged to calculate the tire pressure parameter as a predetermined function of the values of the set of predetermined vehicle parameters, wherein said predetermined function has been generated by training a machine learning system using values of a large number of sets of predetermined vehicle parameters and associated tire pressure parameters.

3. The system according to claim 1, wherein the pre-trained machine learning system or predetermined function has been generated to be specific to a particular vehicle model.

4. The system according to claim 1, wherein the pre-trained machine learning system or predetermined function has been generated to be generic, so that it may be used in many different types of vehicles.

5. The system according to claim 1, wherein the pre-trained machine learning system or predetermined function has been generated using values of the sets of predetermined vehicle parameters where brief fluctuations have been removed.

6. The system according to claim 1, wherein the tire pressure parameter indicates the tire pressure level, and the tire pressure status is set to be TRUE if the tire pressure parameter is smaller than the threshold, and FALSE if the tire pressure parameter is not smaller than the threshold.

7. The system according to claim 1, wherein the tire pressure parameter indicates by how much the tire pressure has fallen, and the tire pressure status is set to be TRUE if the tire pressure parameter is greater than the threshold, and FALSE if the tire pressure parameter is not greater than the threshold.

8. The system according to claim 1, further comprising a user interface from which the at least one processing device may receive a calibration request signal.

9. The system according to claim 8, wherein the at least one processing device is arranged to calculate said tire pressure parameter after receiving a calibration request signal.

10. A system for determining a tire pressure status in a vehicle, the system comprising:
    at least one processing device arranged to:
        estimate values of a set of predetermined vehicle parameters;
        calculate a tire pressure parameter based on the values of the set of predetermined vehicle parameters using a pre-trained machine learning system or predetermined function; and
        determine a tire pressure status, indicating whether or not there is tire under-inflation, by comparing said tire pressure parameter with a threshold; and
    a user interface from which the at least one processing device may receive a calibration request signal,
    wherein the at least one processing device is arranged to calculate said tire pressure parameter after receiving a calibration request signal, and
    wherein the at least one processing device is arranged to ignore the calibration request signal and maintain or reissue any active tire pressure warnings if the tire pressure status indicates that there is tire under-inflation.

11. The system according to claim 1, wherein the set of predetermined vehicle parameters comprises at least the resonance frequency and the longitudinal stiffness or slip slope.

12. A method for determining a tire pressure status in a vehicle, the method comprising:
    training a machine learning system or function;
    estimating values of a set of predetermined vehicle parameters;
    calculating a tire pressure parameter based on the values of the set of predetermined vehicle parameters using said pre-trained machine learning system; and
    determining a tire pressure status, indicating whether or not there is tire under-inflation, by comparing said tire pressure parameter with a threshold,
    wherein the set of predetermined vehicle parameters comprises parameters representing spectral characteristics of a wheel speed signal.

13. The method according to claim 12, wherein said training includes generating a trained machine learning system or function by training the machine learning system using values of a large number of sets of predetermined vehicle parameters and associated tire pressure parameters.

14. The method according to claim 12, further comprising generating the pre-trained machine learning system or function to be specific to a particular vehicle model.

15. The method according to claim 12, further comprising generating the pre-trained machine learning system or function to be generic, so that it may be used in many different types of vehicles.

16. The method according to claim 12, further comprising generating the pre-trained machine learning system or function using values of the sets of predetermined vehicle parameters where brief fluctuations have been removed.

17. The method according to claim 12, wherein the tire pressure parameter indicates the tire pressure level, and the method further comprises setting the tire pressure status to be TRUE if the tire pressure parameter is smaller than the threshold, and FALSE if the tire pressure parameter is not smaller than the threshold.

18. The method according to claim 12, wherein the tire pressure parameter indicates by how much the tire pressure has fallen, and the method further comprises setting the tire pressure status to be TRUE if the tire pressure parameter is greater than the threshold, and FALSE if the tire pressure parameter is not greater than the threshold.

19. The method according to claim 12, further comprising receiving a calibration request signal, indicating whether calibration of a tire pressure monitoring system has been requested.

20. The method according to claim 19, wherein the estimating, calculating and determining takes place when a calibration request signal has been received.

21. A method for determining a tire pressure status in a vehicle, the method comprising:
- training a machine learning system or function;
- receiving a calibration request signal, indicating whether calibration of a tire pressure monitoring system has been requested;
- estimating values of a set of predetermined vehicle parameters;
- calculating a tire pressure parameter based on the values of the set of predetermined vehicle parameters using said pre-trained machine learning system; and
- determining a tire pressure status, indicating whether or not there is tire under-inflation, by comparing said tire pressure parameter with a threshold,
- wherein the estimating, calculating and determining takes place when a calibration request signal has been received, and
- wherein the calibration request signal is ignored and any active tire pressure warnings is maintained or reissued if the tire pressure status indicates that there is tire under-inflation.

22. The method according to claim 12, wherein the set of predetermined vehicle parameters comprises at least the resonance frequency and the longitudinal stiffness or slip slope.

\* \* \* \* \*